E. E. KUEHL.
BRAKE LEVER.
APPLICATION FILED APR. 21, 1911.
1,012,371.
Patented Dec. 19, 1911.
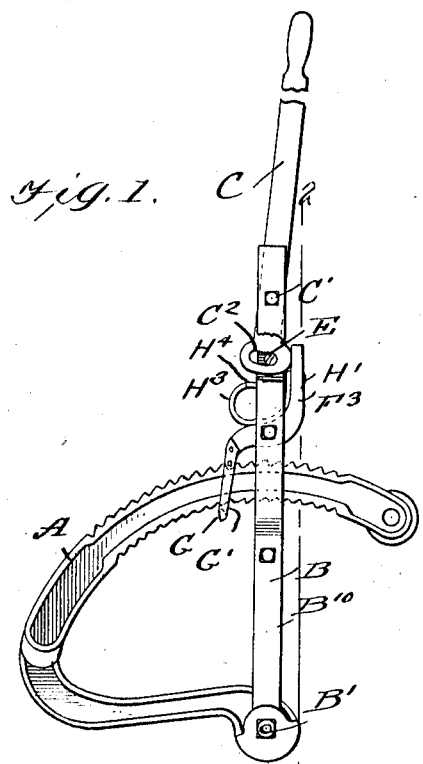
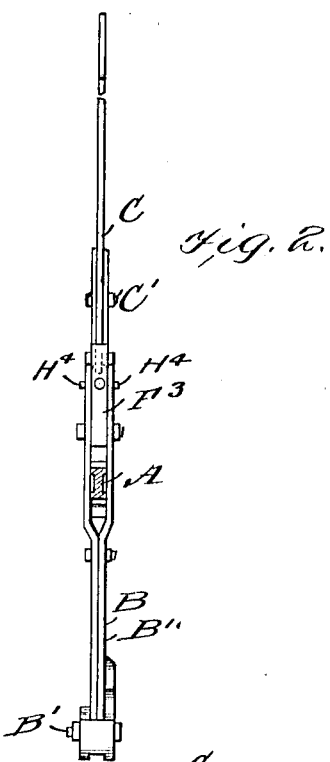
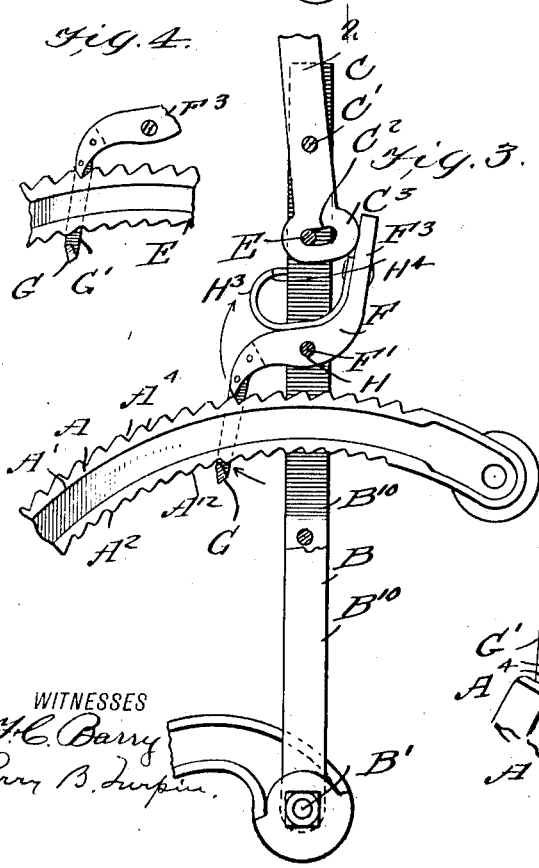
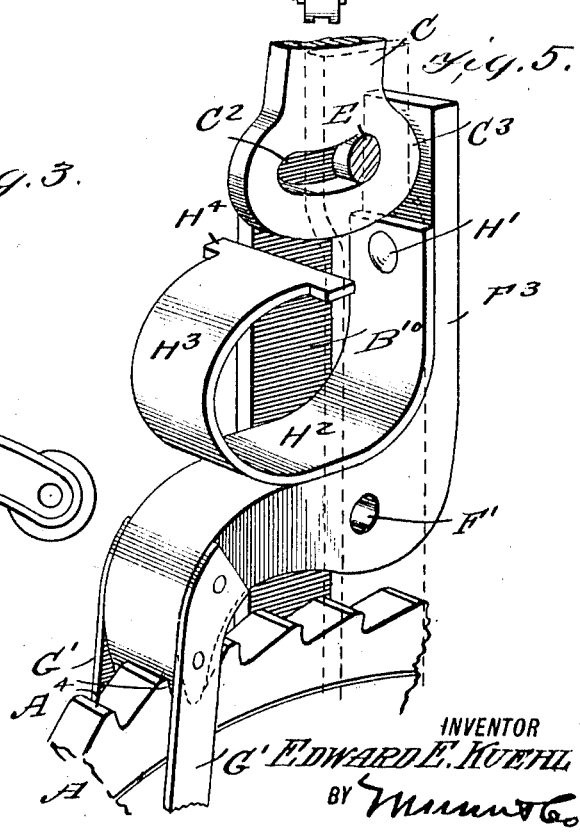
WITNESSES
INVENTOR
Edward E. Kuehl
BY
ATTORNEYS

UNITED STATES PATENT OFFICE.

EDWARD E. KUEHL, OF VERDIGRIS, NEBRASKA.

BRAKE-LEVER.

1,012,371.   Specification of Letters Patent.   Patented Dec. 19, 1911.

Application filed April 21, 1911. Serial No. 622,552.

*To all whom it may concern:*

Be it known that I, EDWARD E. KUEHL, a citizen of the United States, and a resident of Verdigris, in the county of Knox and State of Nebraska, have invented certain new and useful Improvements in Brake-Levers, of which the following is a specification.

This invention is an improvement in levers and especially in brake levers designed for use in connection with any suitable brake mechanism; and the invention consists in certain novel constructions and combinations of parts as will be hereinafter described and claimed.

In the drawing Figure 1 is a side view of a brake mechanism embodying my invention. Fig. 2 is a section on about line 2—2 of Fig. 1. Fig. 3 is a detail side view, partly broken away and partly in section, showing the handle in a different position from that shown in Fig. 1. Fig. 4 is a detail side view enlarged showing the dog engaged with the upper teeth of the rack. Fig. 5 is a detail perspective view, partly broken away, showing the dog or pawl and the parts immediately associated therewith.

In carrying out the invention, I provide a segment rack A and a brake lever having a main or body portion B and a handle portion C. The main or body portion B is pivoted at B' and the handle C is pivoted at C' to the main portion B, and is provided below said pivot C' with a slot $C^2$ into which projects a stop pin E which limits the rocking of the handle C on its pivot C', the said handle C being movable to a position shown in Fig. 1 or to the opposite position shown in Fig. 3 for the purposes presently described.

The dog F is pivoted at F' to the body portion of the lever between the rack and the slotted or head portion $C^3$ at the lower end of the handle C and this dog engages with the segment A in a manner more fully described hereinafter.

The segment A is provided with teeth or notches which may be disposed along both its upper and lower edges as shown in Figs. 1 and 3.

As shown in Figs. 1, 3 and 4, the segment A has the upper teeth A' and the lower teeth $A^2$. The upper teeth have their faces $A^4$ preferably curved on the arcs of circles struck from the pivot F' as a center and the distance from the pivot F' to the point $F^2$ of the dog, as a radius, and the upper ends of the said teeth A' are preferably blunted as shown at $A^3$ in order to give the said teeth greater strength and to prevent the chipping or breaking off of the upper ends of the teeth by the point $F^2$ of the dog as the latter is moved forcibly back over the teeth from the right to the left end of the rack in the construction shown in Fig. 1. I prefer to employ this form of rack tooth and appendant bail-like dog G to engage the lower teeth because of the advantages incident thereto as will be hereinafter suggested, but manifestly I do not wish to be limited in the broad features of my invention thereto.

The lower teeth $A^2$ of the rack segment are engaged by the bail-like pawl G which is supported from the pawl proper F. For mere convenience in applying the parts, the pawl G is shown as riveted to the pawl proper F, the side bars G' of the dog G extending up along the opposite sides of the rack segment as best shown in Fig. 5.

The pawl F being pivoted at F' has its point $F^2$ arranged to engage the teeth A' and is provided with an upwardly extending arm $F^3$ which extends to the rear of the head $C^3$ on the handle C so that when the said handle is moved to the position shown in Fig. 3, it will move the dog or pawl F so that it releases its point $F^2$ from engagement with the teeth A' of the segment A, and when the handle C is moved to the position shown in Fig. 5, it will free the dog or pawl F so the latter may be forced into engagement with the rack teeth A' by means of the spring H. This spring H is of a special construction, being fixed at H' to the upwardly projecting arm $F^3$ of the dog F and curving thence downwardly to a point $H^2$ and thence forwardly and upwardly to point $H^3$ and thence rearwardly to a point where it bears with its upper free edge against the front edges of the side bars $B^{10}$ of the main or body portion B of the brake lever. Thus in operation, the spring H draws the upwardly projecting arm $F^3$ of the dog forwardly from the position shown in Fig. 3 to that shown in Figs. 1 and 5 and forces the point $F^2$ of the dog downwardly into engagement with the teeth A' of the rack segment as shown in Figs. 1 and 5.

The pendant bail-like dog G operates to prevent the dog F from jumping teeth as it moves to the left from the position showing Figs. 1 and 3. It is found that in practice when the dog is released and the heavy load is permitted to pull the lever forwardly, the dog has a tendency, when the handle lever C is pushed to the position shown in Fig. 3, to jump over two or more of the teeth A'. This is objectionable for several reasons, among which may be mentioned the danger resulting from such action, of breaking or chipping off the upper ends of the teeth A'. The dog G being carried by the dog F, will, when the said dog F is released from the tooth A', be drawn up into engagement with the inclined face $A^{12}$ of the corresponding tooth $A^2$ on the lower edge of the rack and in the movement of the lever to the left, it will be necessary for this dog to ride on the inclined face $A^{12}$ which will draw the point $F^2$ of the dog F down into engagement with the corresponding tooth A' as will be understood from the drawings and the foregoing description.

Manifestly when so desired, the rack segment may be made without the lower teeth $A^2$ and the dog without the pendant portion G, such construction being illustrated in Fig. 6 of the drawing.

It will be noticed that the spring H serves a double function in that it operates the dog into engagement with the rack teeth A' and also readjusts the handle C to and holds it normally in the position shown in Figs. 1 and 5.

I claim:

1. The combination substantially as herein described of a rack segment having teeth along its upper and lower edges, a lever having a main portion pivoted below the rack segment and extending upwardly past the same, a dog pivoted to the said main portion and having a point engaging the teeth of the upper row and a pendent portion having means engaging with the teeth of the lower row of the segment, the said dog having an upwardly projecting arm on the opposite side of its pivot from its said point, a spring secured at one end to said upwardly projecting arm of the dog, and curving thence downwardly and having an upwardly curved portion bearing at its upper end against the front edge of the main portion of the lever, a handle portion pivoted to said main portion of the lever and having below its pivot a head-like portion adapted to engage the upwardly projecting arm of the dog and provided with a transversely elongated slot, and a pin projecting from the main portion of the lever into said slot, and limiting the rocking movement of the handle, substantially as set forth.

2. The combination of a rack segment, a lever having a main or body portion, and a handle portion pivoted to said main or body portion, and having a limited rocking movement, whereby to operate a dog, a dog pivoted to the main or body portion of the lever, and having a point to engage with the rack segment, and an upwardly projecting arm, and a spring for actuating said dog, said spring being secured at one end to the upwardly extending arm of the said dog, extending thence downwardly, and having a portion curving thence upwardly, and bearing against the front edge of the main portion of the lever, substantially as set forth.

3. The combination of a rack segment, a lever having bars extending along opposite sides of the rack segment, a dog pivoted to said bars, and a spring secured to said dog and extending between the said bars and having at one end a widened portion bearing against the front edges of the opposite bars, substantially as set forth.

EDWARD E. KUEHL.

Witnesses:
SOLON C. KEMON,
PERRY B. TURPIN.

Copies of this patent may be obtained for five cents each, by addressing the "Commissioner of Patents, Washington, D. C."